Patented Nov. 6, 1928.

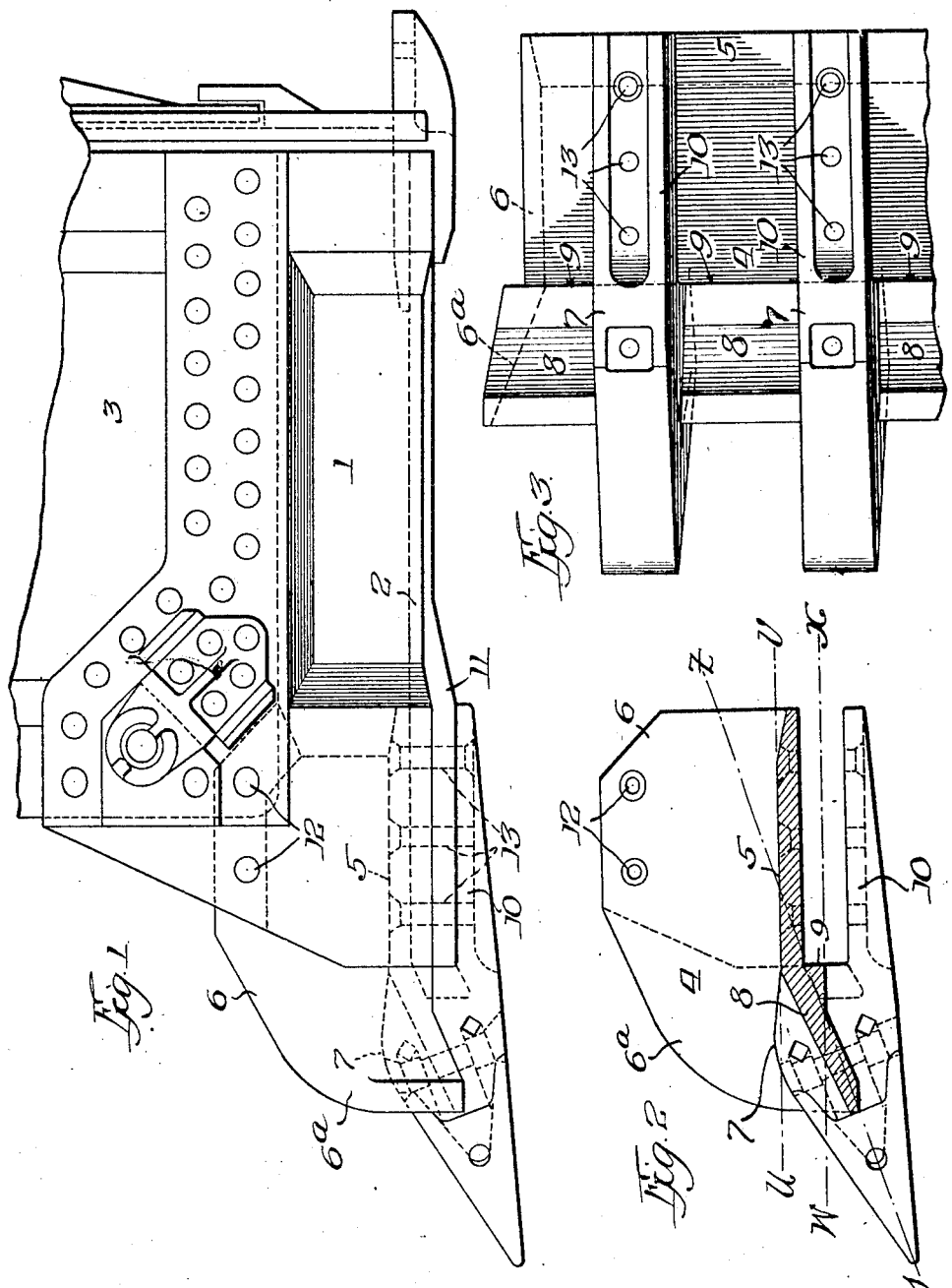

1,690,835

UNITED STATES PATENT OFFICE.

THOMAS RATKOWSKI, OF CHICAGO HEIGHTS, ILLINOIS, ASSIGNOR TO AMERICAN MANGANESE STEEL COMPANY, OF CHICAGO, ILLINOIS, A CORPORATION OF MAINE.

EXCAVATOR LIP WITH INTEGRAL TEETH.

Application filed July 23, 1927. Serial No. 207,855.

This invention relates to the cutting lips applied to the forward or penetrating portions of dippers or other like excavating implements, which lips because of the greater wear which they incur in use, are usually made separate from and removably attached to a wall of the excavating implement.

It has heretofore been proposed, for instance, in U. S. Patent No. 1,503,866, issued August 5, 1924, to the assignee of the present invention, upon the invention of Washburn, Johnson & Thill, to provide an excavating implement with a one-piece cutter lip having a plurality of longitudinally extending ribs on its underside, terminating in pointed digging teeth at their forward ends. But the construction of the one-piece lip and teeth in the said patent was designed primarily for attachment to one side only, namely, the outer side of the wall of the implement to which it is applied, and was intended more particularly for use in excavating implements of smaller capacity rather than those of large capacity which encounter very rough usage.

The object of the present invention is to provide a cutting lip combined with digging teeth suitable for application to the inner surface of the wall of the implement, and at the same time for engagement with the outer surface thereof in a manner to more securely mount the attachment on the implement, and one which will permit the use of an acceptable design of digging tooth and cutting and deflecting margins of the lip in advantageous relation to the teeth; all to the end of improving the digging capacity of the attachment, prolonging its duration in use, insuring a better transmission of thrust stresses, and better adapting the lip to preserve from wear the more expensive element of the implement, namely, the wall to which the attachment is applied. Accordingly, the invention proceeds upon the principle of providing, in an integral structure, digging teeth with a lip adapted to be applied to the inner surface of a dipper or other excavating implement in a manner to not only provide a firm seating of the lip upon the implement and shield the wall of the implement from wear, but to firmly abut the lip against the forward edge of the implement wall in a manner to relieve shearing stresses and minimize the elevation of the bases of the teeth above the plane of the bottom wall of the implement; providing integral inter-tooth cutting portions of a design which upwardly deflect the material as it enters the implement and laterally brace the teeth; providing riveting shanks extending integrally from the under sides of the teeth rearwardly in embrace of the implement wall and providing integral longitudinal pads or ribs on the outer surface of the implement wall against which the riveting shanks seat and through which, as well as through the lip on the inner face, the wall of the implement and the riveting shanks, attaching rivets are made to pass. The teeth, made integral with the lip, may be complete teeth or they may be provided with replaceable and even reversible tips or points, so long as the base or body of the tooth is integral with the attaching and deflecting portions of the lip.

In the accompanying drawing—

Figure 1 is a side elevation of that portion of an excavating dipper with which the present invention is immediately concerned, and to which the preferred embodiment of the invention is shown applied.

Figure 2 is a vertical longitudinal section of the combined teeth and attaching lip, the section being in a plane through the cutting and deflecting portion of the lip so that a tooth, the reinforcing attaching shank, and one of the cheeks through which the lip overlies the sides of the implement, are shown in elevation; and Figure 3 is a bottom plan view of a portion of the combined lip and teeth, to-wit, the portion extending from one end thereof a distance sufficient to include two teeth and the adjacent cutting and elevating portions.

1 represents a portion of an excavating dipper, to-wit, that portion usually referred to as the front of the dipper and which includes the front wall 2 and portions of the side walls of the dipper, and which is usually riveted to the socalled back or body 3 of the dipper, only a fragment of which is herein shown.

4 represents a separately formed lip applied to the front wall 2 of the member 1 of the dipper through means of an attaching plate 5 which overlies the inner surface of said wall 2 and which merges into upwardly extending cheeks 6 which overlie and are riveted to the inner surfaces of the side walls of the dipper. 7 represents a plurality of teeth, and 8 a plurality of cutting webs, all of which are integral with and extend downwardly and forwardly from the plate 5, the webs being located between and integral with the teeth which they strengthen laterally, or being outside of each end tooth of the series, where they are integral with the end tooth and with a forward extension 6ª of the cheeks 6, so that the cheeks sustain the end cutting webs and form lateral confines for directing into the excavator material which is deflected upwardly by the cheeks. 9 represents an abutment that is substantially coextensive with the combined tooth and lip structure, being immediately beneath the plane of the plate 5 and in rear of the webs 8 and the teeth 7. The webs 8 are preferably designed to have a downward and forward inclination corresponding to that of the teeth 7, and the maximum vertical development or salient of the teeth is adjacent to and merges with the plane UV, which is the upper surface of the attaching plate 5 and therefore a minimum distance above the plane of the implement wall 2; and the cutting webs 8 are located adjacent to and their line of merger with the attaching plate 5 is slightly above the bisecting plane YZ of the triangular tooth structure, so that the tooth is kept relatively low in relation to or has its center of mass beneath the wall 2. The abutment 9 is particularly effective in relieving stresses on the rivets which pass through the plate 5 and the thrust is largely transmitted through parts below the line WX which is the lower plane of the wall 2.

The combined tooth and lip structure further comprises rearwardly extending attaching shanks 10 in line with the lower portions of the teeth 7, spaced apart from the attaching plate 5 a distance sufficient to not only admit the plate 2 of the implement above the line WX, but accommodate reinforcing pads or ribs 11 integral with the underside of said wall 2 and against which the attaching shanks 10 seat; and the lip structure is secured in place by rivets 12 passing through the cheeks 6 and the side walls of the implement, and rivets 13 passing through the attaching plate 5, the wall 2, the reinforcing pads 11. and the attaching shanks 10. The points of the teeth and the attaching shanks 10 in alignment therewith are so far below the plane of the wall 2 that end thrust on the teeth is very largely transmitted to the relatively large attaching shanks and reinforcing pads.

By the construction described, a very efficient design of digging tooth is related, through means of the integral attaching lip, in a particularly advantageous manner with respect to distribution of stresses and secure mounting of the combined teeth and lip, and the structure as a whole is made very rigid and durable.

I claim:

1. An integral tooth and lip member for excavating implements, comprising an attaching plate adapted to overlie the inner surface of the wall of the implement, tooth members integral with and extending downwardly and forwardly from said plate member, and attaching shanks extending rearwardly from the lower portions of the tooth members, spaced apart from the plate members to leave a wall-receiving recess between said plate and said attaching shanks; said recess admitting the wall of the implement in a plane which is above the center of mass of the tooth members and their attaching shanks.

2. In combination with the front wall of an excavating implement having external longitudinal reinforcing ribs, a combined tooth and lip structure comprising an attaching plate adapted to the inner surface of said wall, tooth members integral with and extending downwardly and forwardly from said attaching plate, in line with the reinforcing ribs and having the greater portion of its mass below the plane of said wall, and attaching shanks extending integrally from said tooth members rearwardly in line with and seating upon said ribs.

3. In a combined tooth and lip structure for excavating implements, a plate member adapted to overlie the inner surface of a wall of such an implement, tooth members integral with and extending downwardly and forwardly from said plate member, abutments in position to receive the wall of the implement, immediately below said plate member and with said wall located above the center of mass of the tooth members, and attaching shanks extending rearwardly from the lower portions of the tooth members and in position to lie beneath the wall of the implement.

4. In a combined tooth and lip structure for excavating implements, a plate member adapted to overlie the inner surface of the wall of such an implement, tooth members integral with and extending downwardly and forwardly from said plate member, cutting webs intervening between and integral with the tooth members, also inclined downwardly and forwardly from the plate member, and an abutment below the plane of said plate member and in rear of and integral with the web members, adapted to receive the forward margin of the wall of the implement when the structure is applied.

5. In a combined tooth and lip structure for excavating implements, a plate member, tooth members integral with and extending downwardly and forwardly from said plate member, web members intervening between and integral with the tooth members, attaching shanks extending rearwardly from the lower portions of the tooth members and spaced from the plate member to leave a wall-receiving recess, and a wall abutment located in said recess immediately below the plane of the plate member and in rear of and integral with the web members.

6. In combination, an excavating implement having a front wall, and a combined tooth and lip structure comprising a plate member adapted to overlie the inner surface of said wall, tooth members integral with and projecting downwardly and forwardly from said plate member, web members intervening between and integral with adjacent tooth members, also inclined downwardly from the plate member, attaching shanks extending rearwardly from the tooth members on the outside of said wall, and an abutment immediately below the plate member, in rear of the web members, and in abutment with said wall.

7. In combination, an excavating implement having a front wall, and a combined tooth and lip structure comprising a plate member adapted to overlie the inner surface of said wall, tooth members integral with and projecting downwardly and forwardly from said plate member, web members intervening between and integral with adjacent tooth members, also inclined downwardly from the plate member, attaching shanks extending rearwardly from the tooth members on the outside of said wall, and an abutment immediately below the plate member, in rear of the web members, and in abutment with said wall; said wall having reinforcing pads on the outside thereof through which it receives said attaching shanks.

Signed at Chicago Heights, Illinois, this 20 day of July, 1927.

THOMAS RATKOWSKI.